United States Patent [19]

Balakrishnan et al.

[11] Patent Number: 4,759,777
[45] Date of Patent: Jul. 26, 1988

[54] DECONTAMINATION OF WOOD CHIP DRYER GAS

[75] Inventors: Nallepilly Balakrishnan, Deerfield, Ill.; Terry E. Dornan, Kenosha, Wis.

[73] Assignee: Bact Engineering, Inc., Arlington Heights, Ill.

[21] Appl. No.: 119,149

[22] Filed: Nov. 10, 1987

[51] Int. Cl.[4] .............................................. B01D 47/00
[52] U.S. Cl. ........................................ 55/85; 55/90; 55/93; 55/94; 55/228; 55/89; 34/13.8; 34/79; 210/805; 210/806
[58] Field of Search ................... 55/84, 85, 89, 90, 93, 55/94, 228; 34/13.8, 79; 210/806, 805

[56] References Cited

U.S. PATENT DOCUMENTS

| | | | |
|---|---|---|---|
| 2,155,853 | 4/1939 | Anthony | 55/85 |
| 3,853,505 | 12/1974 | Tretter et al. | 55/85 |
| 3,925,040 | 12/1975 | Fattinger | 55/84 |
| 4,253,822 | 3/1981 | Marsh | 34/13.8 |
| 4,339,883 | 7/1982 | Waldmann | 34/79 |

*Primary Examiner*—Bernard Nozick
*Attorney, Agent, or Firm*—Dressler, Goldsmith, Shore, Sutker & Milnamow, Ltd.

[57] ABSTRACT

A method is provided for the decontamination of wood chip dryer flue gas containing wood particles and hydrocarbons which comprises contacting hot flue gas with an aqueous quench liquid to produce a wood particle-containing liquid and a hydrocarbon-containing gasiform product, removing wood particles from the liquid by gravity after densifying the particles with high density colloidal particles and removing hydrocarbons from the gasiform product by contact with an alkaline solution.

20 Claims, 1 Drawing Sheet

DECONTAMINATION OF WOOD CHIP DRYER GAS

BACKGROUND OF THE INVENTION

The manufacture of composition board is an important and growing part of the wood products industry in that it utilizes wood chips that would otherwise be wasted and produces products in a broad spectrum of properties.

Composition board is made from wood chips blended with a synthetic resin binder and compacted to a greater or lesser degree depending on what is desired to be the density of the finished board.

The wood chips used in composition board must be dry; and the chips are generally dried in an dryer before use. The dryer produces a high temperature flue gas containing wood particles and containing hydrocarbon gases, primarily the vapors of terpenes in the wood.

This invention provides a method for decontaminating wood dryer flue gas to produce ecologically acceptable end products.

SUMMARY OF THE INVENTION

In accordance with the present invention, wood chip dryer flue gas which contains wood particles and gasiform hydrocarbons is decontaminated by passing said flue gas into intimate contact with an aqueous liquid to produce thereby a liquid product containing wood particles and a scrubbed gasiform product containing hydrocarbons, treating said liquid product to obtain a wood particle concentrate, ecologically safe for disposal, and a clear liquid, and treating said gasiform product to remove hydrocarbons therefrom and to obtain a gasiform final product ecologically safe for venting into the atmosphere.

The contact of the wood chip dryer flue gas with the aqueous liquid takes place in a scrubber in which both the liquid and the gas move downwardly and the gas velocity is increased in a zone in which the gas flow is constricted to narrow passages.

The treatment of the liquid product containing wood particles after it leaves the scrubber includes the admixture of the liquid product with an aqueous suspension of high density colloidal particles which are adsorped onto the wood particles and serve to increase the density of the wood particles to a level above the density of the liquid product.

The liquid product is then subjected to settling to remove the densified wood particles. Preferably, the larger wood particles are removed by sieving before the smaller wood particles are removed by settling.

The high density colloidal particles are preferably clay particles and most preferably particles of bentonite.

The settling of smaller wood particles is preferably carried out in a clarifier which has a slowly moving belt or chain at its bottom for moving the deposited particles out of the clarifier to disposal. The liquid in the clarifier is diluted with an aqueous alkaline liquid obtained from the treatment of the scrubbed gasiform product, as hereinafter described.

Preferably, a flocculent material is added to the liquid in the clarifier to cause the wood particles to cling to each other and settle more rapidly. Typically, the average residence time for liquid in the clarifier is no more than about 30 minutes and is usually between about 10 and about 20 minutes. The preferred flocculent material is an anionic surfactant polyamid, such as polyacrylamide.

Liquid effluent from the clarifier, substantially free of wood particles, is recycled to the scrubber as at least the major portion of the aqueous liquid introduced therein.

The gasiform effluent from the scrubber contains entrained liquid droplets and entrained wood particles as well as its naturally gasiform constituents, namely the normal constituents of atmospheric air plus the hydrocarbon vapors derived from the wood chips. This gasiform effluent is first passed through a mist eliminator in which chevron-shaped barriers baffle the air flow and force it to take a tortuous path. Wood particles and liquid droplets impinge upon the barriers and are diverted downwardly thereon, and collect and pass, as a stream, into admixture with the wood particle-containing liquid from the scrubber.

After demisting, the scrubbed gasiform effluent is brought into intimate contact with an aqueous alkaline liquid, such as a sodium hydroxide solution, in a packed section. Hydrocarbons are adsorbed in the alkaline liquid; and the substantially hydrocarbon-free gas is thereafter vented after another demisting step.

The alkaline liquid from the packed tower, combined with alkaline liquid from the second mist eliminator is passed to a recirculation tank and blended therein with fresh make-up water and with freshly made sodium hydroxide solution.

A portion of the liquid from the recirculation tank is recycled, after cooling, to the packed tower as the aqueous alkaline liquid therein. Another portion of the mixing tank liquid is passed to the clarifier as a diluent, as hereinbefore described.

To avoid the build up of hydrocarbons in the recycling aqueous liquid, a portion of the liquid passing from the mixing tank to the clarifier and/or a portion of the liquid effluent passing from the clarifier to the scrubber is treated with a strong oxidizing agent, such as hydrogen peroxide, preferably at a concentration in the treating zone from about 5 to about 50 volume percent.

In general, any oxidizing material may be used which has a positive potential with respect to that of the Standard Hydrogen Electrode of at least 1.5 volts and which produces, on reduction, an ecologically acceptable product. Hydrogen peroxide, for example, going to water in the presence of hydrogen ions, has a potential of 1.776 volts. Aqueous permanganate solutions, producing manganese dioxide, and ozone, producing molecular oxygen, may also be used. If ozone is used, it may be introduced in the gaseous state or may be introduced in ozonized water.

The aqueous liquid before treatment with the oxidizing agent is a dark, tarry liquid from which the hydrocarbon component is not readily separable by gravity. The oxidation converts the hydrocarbon component to a light-colored residue which separates as a distinct heavier phase from the aqueous phase of the liquid. Thus, the oxidation permits easy separation and disposal of the hydrocarbons after the settling thereof.

Although hydrogen peroxide is normally used as an oxidizer in an acid environment, applicants, surprisingly, have found it to be effective in oxidizing hydrocarbons in the alkaline environment of the recyling aqueou liquid.

The oxidized hydrocarbons constitute a product which is ecologically acceptable for disposal in land fill, either alone or in a mixture with the wood particle concentrate.

DESCRIPTION OF THE DRAWING

The single FIGURE is a partially schematic flowsheet showing the relationship of the pieces of apparatus used in this invention and the flow paths among them.

DETAILED DESCRIPTION OF THE INVENTION

Figure 1:
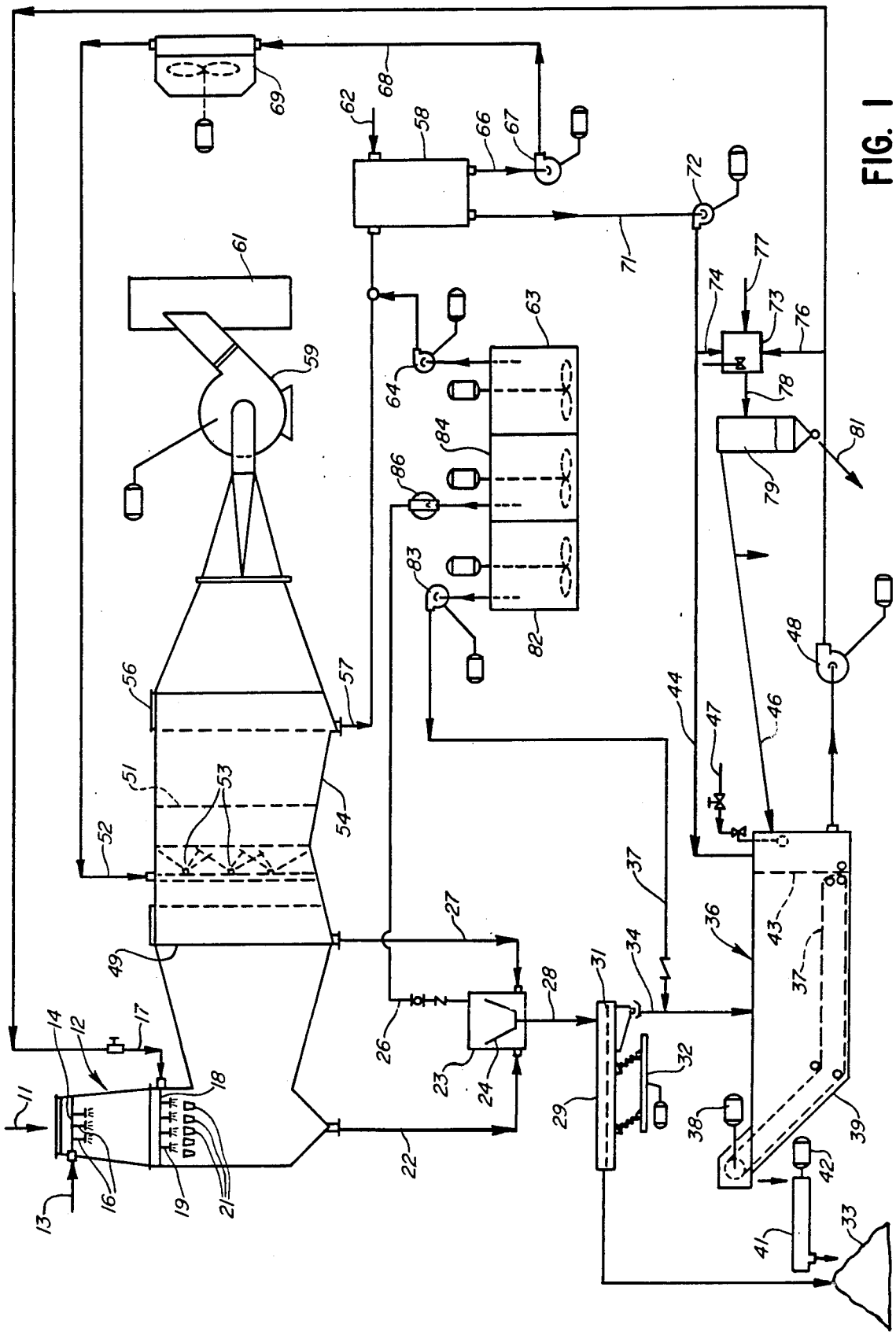

As may be seen in the FIGURE, flue gas from a wood chip dryer, containing wood particles and hydrocarbons is passed through line 11 into the top of scrubber 12. Quench liquid, preferably water, introduced through line 13, manifold 14 and nozzles 16, is directed into the stream of flue gas and then flows downwardly therewith.

Additional quench liquid, from a recycle source described hereinafter, is added through line 17, manifold 18 and nozzles 19.

Elements 21, in the scrubber are partial baffles which cause the flue gas to pass through the narrow passages therebetween and thereby substantially increase its velocity to atomize the quench liquid into small droplets. The width of elements 21 may be adjusted by means known in the art to vary the width of the passages therebetween and thereby adjust the pressure drop to accomodate changes in the space velocity of the flue gas.

In scrubber 12, the quench liquid removes particulate wood matter from the flue gas; and the wood particles are carried in the quench water through line 22 and then the into the lower portion of mixer 23. In the mixer, the liquid flows upward and around the rim of frustoconical barrier 24 into the upper part of the mixer vessel where it is mixed with a clay suspension, or other suspension of high density colloidal particles, introduced through line 26 from a source hereinafter described. Additional wood particle-containing liquid, from a source hereinafter described, is introduced through line 27 into the lower part of mixer 23.

The clay suspension, preferably a suspension of bentonite, is absorbed onto the wood particles in the water suspension and increases the density of the wood particles so that they become more dense than water.

Liquid carrying suspended wood particles is discharged from mixer 23 through line 28 and onto vibrating table 29 which is inclined to be slightly lower at one end (the left end as seen in the FIGURE) than at the other. Vibrating table 29 includes sieve 31 and vibrating mechanism 32.

The larger of the wood particles (larger than about 80 mesh) do not pass through sieve 31 and move toward the left end thereof to drop into pile 33 from which they may be conveyed to land fill. The material in pile 33 is ecologically acceptable.

Liquid passing through sieve 31 and containing small wood particles (smaller than about 80 mesh) passes through line 34 to clarifier 36. A flocculent-containing liquid, from a source hereinafter described, is added through line 87 to the liquid in line 34 and the mixture is held in clarifier 36 for a period sufficient to deposit the flocculated wood particles.

Chain 37 moves along the bottom of clarifier 36, powered by motor 38 and carries deposited wood particles leftward as shown in the FIGURE and over sloping end 39 to screw conveyor 41, powered by motor 42. The wood particles then pass out of conveyor 41 and drop onto pile 33.

Clear liquid from the upper part of clarifier 36 passes over the upper end of barrier 43 into the end portion of the clarifier in which it is blended with recycle liquids, from sources hereinafter described, introduced through lines 44 and 46 and with fresh water introduced through line 47.

Liquid discharge from clarifier 36 is passed through pump 48 to the aforementioned line 17 as the additional quench liquid introduced into scrubber 12 through nozzles 18.

The scrubbed flue gas in the portion of scrubber 12 below nozzles 18 and elements 21 contains entrained liquid droplets and a small amount of very small wood particles. The scrubbed flue gas is passed horizontally through first mist eliminator 49 which contains parallel zigzag plates to ensure that gas passing therethrough must follow a tortuous path. Entrained liquid droplets and solid particles, impinging on the mist eliminator plates, are taken out of the gasiform stream and pass, by gravity through the aforementioned line 27 into the lower part of mixer 23.

The scrubbed flue gas passing through mist eliminator 49 is substantially free of entrained liquid and of wood particles. However, it still contains substantially all of its hydrocarbon content. The hydrocarbons are primarily terpenes. This flue gas passes to tower 51 which contains packing material which is wetted by an aqueous alkaline solution introduced through line 52 and sprayed onto the packing material through nozzles 53. The preferred packing material comprises spheres of fiberglass about 2 inches in diameter. Other packing materials, such as Raschig rings or Berl saddles may also be used.

The alkaline solution in the packed section absorbs the hydrocarbons from the flue gas and becomes dark brown in color. Most of the alkaline solution passes downwardly through scrubber 51 and flows along slope 54 to the base of second mist eliminator 56. A small amount of alkaline solution, in the form of droplets, is entrained in the flue gas and passed to the second mist eliminator 56.

The second mist eliminator is constructed similarly to first mist eliminator 49 and serves to remove entrained droplets of hydrocarbon-containing alkaline liquids from the flue gas.

The liquid trapped in second mist eliminator 56 moves downwardly and joins liquid from scrubber 51 in line 57 flowing to recirculation tank 58.

The gas passing through second mist eliminator 56 flows into blower 59 and is then vented through chimney 61. At this stage, the vented gas is substantially free of solid and gasiform contaminants and is ecologically acceptable for venting.

In recirculation tank 58, fresh water is added through line 62; and an aqueous solution of a strong alkaline material, such as sodium hydroxide, is drawn from tank 63 through pump 64 and thence to mixing tank 58 through line 57.

A portion of the mixed product from tank 58 is withdrawn and passed through line 66, pump 67, line 68 and cooler 69 to line 52 as the alkaline solution sprayed into scrubber 51.

Another portion of the mixed product from tank 58 is withdrawn through line 71 and pump 72 into line 44 as the recycle liquid in the clarifier, as described above.

A small portion of the liquid product in line 44 and/or a small portion of the liquid in line 17 are introduced through lines into mixer 73 through lines 74 and 76, respectively, and blended therein with an aqueous solution of an oxidizing material, introduced through line 77. The oxidation converts the dark hydrocarbons suspended in the liquid product to a light-colored material which is readily separable from the liquid as a separate, heavier phase.

The mixed product from mixer 73 is withdrawn through line 78 and passed into settler 79, where it is maintained for a sufficient time to separate a clear and free-flowing aqueous upper fraction from a heavier lower fraction containing substantially all of the hydrocarbon oxidation products. The residence time in the settler is usually between about 8 and 16 hours, and preferably between about 8 and 10 hours.

The upper fraction from the settler is passed through line 46 to clarifier 36 and the lower fraction is passed to discard through line 81. The discard from line 81 may be combined with the wood particles in pile 33 or may be separately disposed of. This discard, by reason of its oxidation in mixer 73 is light in color and ecologically acceptable.

As shown in the FIGURE, the flocculating agent is maintained in suspension and supplied to line 37 from mixer 82 through pump 83. Similarly, the high density colloidal particles are maintained in suspension and supplied to line 26 from mixer 84 through pump 86.

In a typical operation, wood chip dryer flue gas at a temperature of about 250°–400° F. is introduced into the scrubber at about 40,000 actual cubic feet per minute. Fresh quench water and recycle quench water at about 70° F. introduced at the rates of about 2 gallons per 1000 cubic feet of gas and 10 gallons per 1000 cubic feet of gas, respectively.

Bentonite is supplied to the wood particle-containing liquid in an amount from about 0.05 to about 0.25 pounds per pound of wood particles in the liquid.

Alkaline liquid is maintained in the recirculation tank at a pH of about 8.2–8.3 and is recycled to the packed tower at the rate of about 4 to 5 gallons per 1000 cubic feet of flue gas.

The alkaline liquid in the clarifier is generally at a pH level of about 7 to 7.5.

The invention has been described with respect to its preferred embodiments. It will be understood by those skilled in the art that modifications may be made without departing from the scope of the invention as defined in the claims.

1. The method of decontaminating wood chip dryer flue gas which is at high temperature and contains wood particles and gasiform hydrocarbons comprising passing said flue gas into intimate contact with an aqueous liquid to produce thereby a liquid product containing wood particles and a scrubbed gasiform product containing hydrocarbons, separating said liquid product to obtain a wood particle concentrate, ecologically safe for disposal, and a clear liquid and treating said gasiform product to remove hydrocarbons therefrom by intimate contact of said gasiform product with an alkaline aqueous solution to obtain a hydrocarbon-containing liquid product and a substantially hydrocarbon-free vent gas ecologically safe for venting into the atmosphere.

2. The method of claim 1 wherein said gasiform product is treated to remove liquid droplets after said treatment with said alkaline solution.

3. The method of claim 1, wherein a portion of said alkaline solution comprises a recycle of previously contacted alkaline solution.

4. The method of claim 1, wherein said liquid product treatment comprises admixture of said liquid product with an aqueous suspension of high density colloidal particles, adsorption of said colloidal particles onto said wood particles, and gravity separation of said wood particles containing adsorbed colloidal particles from said liquid product.

5. The method of claim 4, wherein said high density colloidal particles are particles of bentonite.

6. The method of claim 5 wherein said particles of bentonite in said admixture constitute from about 0.05 to about 0.25 weight percent of the amount of wood particles in said liquid.

7. The method of claim 4 wherein said liquid product is passed through a sieve and wherein wood particles retained on said sieve are passed to disposal.

8. The method of claim 7 wherein said liquid product passes through said sieve after being admixed with said colloidal particles.

9. The method of claim 7 wherein said liquid product passing through said sieve is retained in a clarifier for a period of at least 10 minutes.

10. The method of claim 9 wherein said liquid contained in said clarifier contains a flocculent material.

11. The method of claim 9 wherein wood particles containing adsorbed colloidal particles settle to the bottom of said clarifier and are thence passed to disposal.

12. The method of claim 11, wherein at least a portion of the liquid in the clarifier after the settling of said wood particles is recycled to contact incoming flue gas.

13. The method of claim 1, wherein said alkaline aqueous solution comprises sodium hydroxide.

14. The method of claim 13, wherein said sodium hydroxide solution is at a pH level between about 8.2 and about 8.3.

15. The method of claim 1 wherein said gasiform product is treated to remove liquid droplets before said treatment with said alkaline solution.

16. The method of claim 15 wherein said gasiform product is again treated to remove liquid droplets after said treatment with said alkaline solution.

17. The method of claim 16 wherein said liquid droplets removed prior to said treatment with said alkaline solution are collected and blended with said wood particle-containing liquid product and said liquid droplets removed after said treatment with said alkaline solution are collected and blended with said hydrocarbon-containing liquid product.

18. The method of claim 1, wherein said hydrocarbon-containing liquid is thereafter brought into intimate contact with an aqueous oxidizing solution.

19. The method of claim 18, wherein said aqueous oxidizing solution comprises a solution of hydrogen peroxide.

20. The method of claim 19, wherein said solution of hydrogen peroxide produces a concentration of hydrogen peroxide at contact with said hydrocarbon-containing liquid a concentration between about 5 and about 50 volume percent of hydrogen peroxide.

* * * * *